3,434,995
RODENT REPELLENT COATING
James A. Shotton, Bartlesville, Okla., assignor to Phillips Petroleum Company, a corporation of Delaware
No Drawing. Filed Nov. 14, 1966, Ser. No. 593,725
Int. Cl. C09d 5/14; C08f 45/64
U.S. Cl. 260—31.2                                    9 Claims

ABSTRACT OF THE DISCLOSURE

A coating composition comprising an N,N-dimethyl sulfenyl dithiocarbamate and polyvinylbutyral, said composition being suitable for protecting against rodents objects made of natural or synthetic materials.

---

This invention relates to a rodent repellent coating. In one of its aspects, the invention relates to a coating composition suitable for application to plastic and/or rubber-containing materials which are to be placed in the ground. In another of its aspects, the invention relates to a rodent repellent coating for cables. In a still further aspect of the invention, it relates to a crack-resistant, weather and abrasion resistant coating for plastic and/or rubber objects which may be used above or below a surface of the ground.

In one of its concepts, the invention provides a coating for a plastic and/or rubber-containing material, the coating containing a minor amount of polyvinylbutyral. In another of its concepts, the invention relates to a coating composition suitable for application to protect plastic and/or rubber materials against deterioration by weathering or by rodents, the composition comprising a protectant and a polyvinylbutyral. In a further concept still, the invention provides a coating for plastic and/or rubber covered cables and the like which will provide a higher effective concentration of repellent, yet form a flexible coating on the surface of, say, a cable, the coating comprising a repellent and polyvinylbutyral. In another of its concepts, the invention is a composition comprising an N,N-dimethyl sulfenyl dithiocarbamate, as a repellent and polyvinylbutyral, such a composition when prepared in solution form, as described herein, yielding a coating uniquely possessing good adherence, flexibility, toughness, resistance to abrasion, stability to sunlight, and resistance to weathering, all the while constantly providing, due to migration of the repellent to the surface thereof, excellent protection thereof against damage, as by rodents.

I have found that a more active and permanent repellent surface with a higher effective concentration of repellent available for use can be obtained by using a mixture of repellent and polyvinylbutyral to form a flexible coating on the surface of, say, a cable, ordinarily subject to deterioration due to physical or weather forces or damage by rodents. The coating of my invention, because it contains polyvinylbutyral, uniquely fulfills the following requirements.

(1) It adheres to the cable or other object to which it is applied.

(2) It remains flexible throughout the life of said object.

(3) It is tough and resists abrasion.

(4) It is stable to sunlight and resistant to weathering.

During use of the coated cables of my invention, the surface layer of repellent is constantly renewed by migration of the repellent to the surface so that the cable remains repellent after being dragged along the ground, after long exposure to the weather, or after long-time buried use, and thus is protected in all senses of the word and particularly against rodents.

An object of this invention is to provide a protective composition. Another object of the invention is to provide a composition suitable for application to plastic or rubber-covered objects. A still further object of the invention is to provide a composition for protecting against damage by rodents plastic and/or rubber-covered objects such as cables. A still further object of the invention is to provide a coating for objects which will be adherent, remain flexible, be tough and resistant to abrasion, stable to sunlight, and resistant to weathering. A further object of the invention is to provide a coating composition comprising a repellent which will suitably migrate to the surface of the composition when it has been applied as a coating to provide continuously protection for example against rodents. A still further object of the invention is to provide a cable coating resistant to nutria damage.

Other concepts, objects and the several advantages of this invention are apparent from a study of this disclosure and the appended claims.

According to this invention there is provided a coating composition comprising a mixture of a repellent and polyvinylbutyral. Also according to the invention, there is provided a method for protecting an object, for example plastic and/or a rubber-covered object, which comprises applying to said object a coating mixture comprising a repellent and polyvinyl butyral. Still further according to the invention, there is provided a coating composition comprising a repellent effective against rodents such as an N,N-dimethyl sulfenyl dithiocarbamate and polyvinylbutyral. Still further according to the invention there is provided a solution suitable for application to a plastic and/or to a rubber object to provide a coating thereon, the solution containing a repellent, polyvinylbutyral, and a solvent.

The coatings of this invention can be applied to all types of objects such as containers for delicate instruments or cable coverings. These can be made of natural rubber, neoprene, synthetic rubbers such as butadiene polymers or butadiene-styrene copolymers, polyurethane, polyvinyl chloride, and olefin polymers, copolymers, and terpolymers such as polyethylene, polypropylene, ethylene-butene-1 copolymer, ethylene-propylenediene copolymers, and the like.

The coating can be applied immediately after the application of the covering or can be applied at a later date.

The repellent used in admixture with the polymeric material, i.e., with the polyvinylbutyral, can be selected from among those available for repelling insects, birds, and/or mammals, e.g., rodents, capable of inflicting damage on the covering or cable. For things in the ground, a considerable amount of the damage inflicted to them is by rodents such as rates or gophers. Even on the ground or above the surface of the ground, damage by rodents can occur.

U.S. Patent 2,862,850, Lyle D. Goodhue, issued Dec. 2, 1958, describes and claims a method for protecting material normally consumed as food by rodents which comprises applying in an amount sufficient to effectively repel said rodents, a compound selected from the group consisting of N,N-dimethyl-S-tert-butylsulfenyl dithiocarbamate and N,N-dimethyl-S-methylsulfenyl dithiocarbamate, incorporated with an inert repellent adjuvent as a carrier therefor. Compositions are also set forth, described and claimed. Thus a particularly and highly effective composition according to the present invention will contain N,N-dimethyl-S-tert-butylsulfenyl dithiocarbamate. A mixture of repellent and polymeric material usually contains from about one to about 90 and 95 weight percent repellent.

A convenient method of application of the composition of the invention to a covering, coating or cable, is as a solution in a suitable solvent such as a ketone, an alcohol or the like, or an aromatic such as benzene, toluene, xyl ene and the like, or an ester such as ethyl acetate, butyl acetate, and the like. Included among the ketones, alcohols, aromatics and esters, and other solvents are: acetone, methylethyl ketone, dipropyl ketone, methylisopropyl ketone, methylisobutyl ketone, amyl alcohol, butyl alcohol, isobutyl alcohol, ethylbutyrate, propylbutyrate, isobutylisobutyrate, methylpropionate, ethylpropionate methylvalerate, ethylvalerate, and the like. The formulation of a composition now among those preferred and preferred among them will contain from about 1 to about 10 parts by weight of N,N-dimethyl-S-tert-butylsulfenyl dithiocarbamate and from about 1 to about 10 parts by weight of polyvinylbutyral, both based on 100 parts by weight of solvent. Generally, the solvent can be any solvent or mixture of solvents boiling below about 300° F. in which both components are soluble. Solvents boiling above the given temperature can also be used, but are not now considered as effective as those which boil below about said temperature.

In one form of the invention, the method includes the steps of dissolving say the dithiocarbamate repellent selected and polyvinylbutyral, which are solids, in isopropyl alcohol followed by addition of methyl ethyl ketone to form a bath containing approximately 4.5 pints isopropyl alcohol, 1.5 pints methyl ethyl ketone, ¼-pound of N,N-dimethyl-S-tert-butylsulfenyl dithiocarbamate, and ⅛-pound polyvinyl butyral. As applied to cables, there are pulled through a bath of the solution and then immediately through a section of heated pipe for drying the coating thus applied. A pipe which has been used for heat drying the coating was 14 feet long. The coating is adherent and pulling the cable through the pipe does not appreciably remove the coating from the cable. Thus, the coating of the invention advantageously is adapted to the method of coating of the invention.

While a specific method of coating a cable or other object has been set forth herein, it is within the scope of the invention of the appended claims to spray the solution on the cable or other object or to otherwise apply the same. When the coating is rather viscous, it may be buttered or squeezed or otherwise physically applied to the cable covering.

The coating of the invention is applicable to interdict an area of surface or a place in the ground against entry by creatures therein simply by applying the composition of the invention to said area or place. For example, the coating can be applied to the trunks of shrubbery, trees, and the like, to trash and garbage containers and/or the area around such containers, to the base of buildings, and the like.

EXAMPLE I

A solution is prepared containing 5 parts by weight polyvinylbutyral and 5 parts N,N-dimethyl-S-tert-butylsulfenyl dithiocarbamate in 100 parts of methyl ethyl ketone. This solution is used to coat both rubber-covered and plastic-covered geophone cable.

A previously used rubber-coated cable is cleaned by washing with heptane, and is dipped in a benzene solution of gum rubber and allowed to dry, thereby forming an adherent film of fresh rubber. The cable is then dipped in the solution of repellent and polymeric material and dried. A highly-adherent flexible coating is formed. When used in the field this cable is found to have fewer rodent nibbles per unit length and to maintain repellency for a longer period than a cable coated with repellent only.

A freshly formed polyethylene-coated cable is dipped in the solution of repellent and polymeric material and dried. When used in the field this cable is found to have fewer rodent nibbles per unit length and to maintain repellency for a longer period than a cable coated with repellent only.

EXAMPLE II

Both rubber-covered and polyurethane-covered geophone cables were coated by being pulled at ambient temperature through a bath having the following composition:

| | Parts by weight |
|---|---|
| Isopropyl alcohol | 75 |
| Methyl ethyl ketone | 25 |
| N,N-dimethyl-S-tert-butylsulfenyl dithiocarbamate | 5 |
| Polyvinylbutyral | 2.5 | and were then dried by passage through a 14-foot section of 6-inch (nominal) pipe heated to about 200° F.

EXAMPLE III

Both rubber-covered and polyurethane-covered geophone cables were coated in the same manner as in Example II except that the polyvinylbutyral was omitted from the recipe.

EXAMPLE IV

The cables of Examples II and III were used in geophysical exploration in the marsh area of Louisiana. Nutria damage to the cables of Example III was considerable whereas the cables of Example II were unattacked.

EXAMPLE V

Rubber- and polyurethane-covered cables are coated in the same manner as in Example I using baths having the following composition:

| | Parts by weight |
|---|---|
| Methyl ethyl ketone | 100 |
| N,N-dimethyl-S-tert-butylsulfenyl dithiocarbamate | 5 |
| Polyvinyl chloride or methyl methacrylate | 2.5 |

The coatings obtained cracked during normal handling operations.

Patents setting forth some, but not all, of the repellents and insecticides which can be formulated according to the present invention are: 3,044,930, Lyle D. Goodhue and Kenneth E. Cantrel, July 17, 1962; 3,055,803, Lyle D. Goodhue and Kenneth E. Cantrel, Sept. 25, 1962; 3,060,081, Lyle D. Goodhue, Rector P. Louthan and Roy E. Stansbury, Oct. 23, 1962; 3,067,091, John E. Mahan and Roy E. Stansbury, Dec. 4, 1962; 3,067,093, Lyle D. Goodhue, Kenneth E. Cantrel and Rector P. Louthan, Dec. 4, 1962; 3,079,298, Lyle D. Goodhue and Kenneth E. Cantrel, Feb. 26, 1963; 3,092,542, Lyle D. Goodhue, Kenneth E. Cantrel and Rector P. Louthan, June 4, 1963; 3,108,037, Lyle D. Goodhue, Raymond L. Cobb and Kenneth E. Cantrel, Oct. 22, 1963; 3,108,039, Donald E. Carr, Oct. 22, 1963; 3,238,097, Andrew J. Reinert and Jennings P. Blackwell, Mar. 1, 1966; 3,252,858, Lyle D. Goodhue, May 24, 1966; 3,269,902, Lyle D. Goodhue and Roger F. Kleinschmidt, Aug. 30, 1966.

Patent 2,862,850, Lyle D. Goodhue, issued Dec. 2, 1958, has already been mentioned earlier herein. It relates to and claims a method and composition for rodent repelling employing an N,N-dimethyl sulfenyl dithiocarbamate.

Reasonable variation and modification are possible within the scope of the foregoing disclosure and the appended claims to the invention, the essence of which is that polyvinylbutyral has been found particularly well adapted to provide by its incorporation therein a considerably better protective composition, as described herein, suited to the protection of objects or areas as herein described.

I claim:

1. A composition suited to protect upon its application thereto an object or place against rodents or other vermin consisting essentially of a repellent and polyvinylbutyral, the repellent being present in a proportion such that upon application the desired protection against said rodents or other vermin can be effective and the polyvinylbutyral being present in a proportion in the composition such that it will extend substantially throughout the entire application in an amount effective to render the application adherent, flexible, yet tough and resistant to abrasion while yielding a sufficient migration to the surface of the application of the repellent in the composition, said repellent being an N,N-dimethyl sulfenyl dithiocarbamate and the repellent being in a proportion relative to polyvinylbutyral in the composition in the approximate range of 10:1 to 1:10 the composition being applicable for use employing a solvent.

2. A composition according to claim 1 wherein the repellent is N,N-dimethyl-S-tert-butylsulfenyl dithiocarbamate.

3. A composition according to claim 1 wherein the repellent and the polyvinylbutyral are diluted with an organic volatile solvent.

4. A composition according to claim 3 wherein the solvent is selected from ketones, alcohols, aromatic solvents and esters.

5. A composition according to claim 1 wherein the repellent is an N,N-dimethyl-S-tert-butylsulfenyl dithiocarbamate and the solvent is selected from isopropyl alcohol, methylethyl ketone and a mixture of these solvents, the carbamate is present in an amount of from about 1 to about 10 parts by weight, the polyvinylbutyral is present from about 1 to about 10 parts by weight, both based on 100 parts by weight of solvent.

6. A protected object having a coating composition thereon comprising repellent and polyvinylbutyral according to claim 1.

7. A protective cable covering having a coating composition thereon according to claim 1.

8. A protected object comprising at least one of a natural rubber, neoprene, synthetic rubbers such as butadiene polymers or butadiene-styrene copolymers, polyurethane, polyvinyl chloride, and olefin polymers, copolymers, and terpolymers such as polyethylene, polypropylene, ethylene-butene-1 copolymer, ethylene-propylene-diene copolymers, having thereon a coating composition according to claim 1.

9. A method of obtaining a protected object according to claim 8 wherein a composition according to claim 1 is diluted with an organic volatile solvent and the thus diluted composition is applied to said object.

References Cited

UNITED STATES PATENTS

| | | | |
|---|---|---|---|
| 2,549,101 | 4/1951 | Koch | 117—128.4 |
| 2,822,296 | 2/1958 | Barrett. | |
| 2,222,638 | 11/1940 | Szilard. | |
| 2,862,850 | 12/1958 | Goodhue | 167—46 |
| 2,222,639 | 11/1940 | Pirk | 167—46 |
| 3,269,902 | 8/1966 | Goodhue. | |
| 2,469,320 | 5/1949 | Swan. | |
| 3,256,212 | 6/1966 | Grover. | |
| 3,234,161 | 2/1966 | Snelgrove. | |

OTHER REFERENCES

Plump Industrial and Eng. Chem., vol. 36, No. 11, pp. 1,035–1,037, November 1944.

Monsanto Vynate, 1944, 10 pages.

ALLAN LIEBERMAN, *Primary Examiner.*

U.S. Cl. X.R.

260—32.8, 33.4, 33.6; 167—46